US010770831B2

(12) United States Patent
Kralik

(10) Patent No.: US 10,770,831 B2
(45) Date of Patent: Sep. 8, 2020

(54) STRAIN RELIEF HOSE BARB CABLE CONNECTOR

(71) Applicant: Western Technology, Inc., Bremerton, WA (US)

(72) Inventor: Michael Kralik, Bremerton, WA (US)

(73) Assignee: Western Technology, Inc., Bremerton, WA (US)

( * ) Notice: Subject to any disclaimer, the term of this patent is extended or adjusted under 35 U.S.C. 154(b) by 0 days.

(21) Appl. No.: 16/216,618

(22) Filed: Dec. 11, 2018

(65) Prior Publication Data

US 2019/0305476 A1     Oct. 3, 2019

Related U.S. Application Data

(60) Provisional application No. 62/650,835, filed on Mar. 30, 2018.

(51) Int. Cl.
*H01R 13/56*      (2006.01)
*H01R 43/26*      (2006.01)

(52) U.S. Cl.
CPC .......... *H01R 13/562* (2013.01); *H01R 43/26* (2013.01)

(58) Field of Classification Search
CPC ....... H01R 13/56; H01R 13/562; H01R 43/26
USPC ................... 439/445, 447; 174/135
See application file for complete search history.

(56) References Cited

U.S. PATENT DOCUMENTS

| 3,051,774 | A |   | 8/1962  | Schelke          |              |
|-----------|---|---|---------|------------------|--------------|
| 4,369,992 | A | * | 1/1983  | Fournier         | F16L 33/2076 |
|           |   |   |         |                  | 285/256      |
| 4,437,689 | A |   | 3/1984  | Goebel et al.    |              |
| 4,603,026 | A |   | 7/1986  | Martin           |              |
| 5,094,552 | A | * | 3/1992  | Monroe           | G02B 6/3887  |
|           |   |   |         |                  | 385/76       |
| 5,137,309 | A |   | 8/1992  | Beagle           |              |
| 5,212,752 | A | * | 5/1993  | Stephenson       | G02B 6/3831  |
|           |   |   |         |                  | 385/78       |
| 5,217,393 | A |   | 6/1993  | Del Negro et al. |              |
| 5,380,224 | A | * | 1/1995  | DiCicco          | H01R 4/70    |
|           |   |   |         |                  | 439/447      |
| 5,390,272 | A | * | 2/1995  | Repta            | G02B 6/3887  |
|           |   |   |         |                  | 385/100      |
| 5,933,557 | A | * | 8/1999  | Ott              | G02B 6/3887  |
|           |   |   |         |                  | 385/86       |

(Continued)

*Primary Examiner* — Oscar C Jimenez

(57) ABSTRACT

An electrical cable connector assembly comprises an electronics connector fitting having a first coupling portion and a second coupling portion, and a connector body having a connection portion coupled to the second coupling portion of the electronics connector fitting. The connector body has a sleeve interface portion formed about an outer surface of the connector body. An elongate compliant sleeve has a connector interface portion coupled to the sleeve interface portion of the connector body to form a coupling interface having a keyed profile. The elongate compliant sleeve has an electrical cable channel configured to receive a portion of an electrical cable electrically coupleable to an electronics device, and configured to relieve strain on the electrical cable in at least one radial direction relative to a longitudinal central axis of the connector body. The electrical cable channel is sized larger than the electrical cable to permit some movement of the electrical cable relative to the elongate compliant sleeve.

25 Claims, 7 Drawing Sheets

(56) References Cited

U.S. PATENT DOCUMENTS

| | | | |
|---|---|---|---|
| 6,102,445 A * | 8/2000 | Thomas | F16L 25/0036 |
| | | | 285/139.1 |
| 6,398,586 B1 * | 6/2002 | Muzslay | H01R 9/032 |
| | | | 439/192 |
| 6,435,911 B1 | 8/2002 | Payson et al. | |
| 6,910,910 B2 | 6/2005 | Cairns | |
| 7,055,868 B2 * | 6/2006 | Watanabe | F16L 25/0036 |
| | | | 285/249 |
| 7,481,662 B1 | 1/2009 | Rehrig | |
| 7,695,197 B2 | 4/2010 | Gurreri | |
| 8,062,063 B2 | 11/2011 | Malloy et al. | |
| 9,024,191 B2 * | 5/2015 | Paynter | B29C 45/14598 |
| | | | 174/74 A |
| 9,429,732 B2 * | 8/2016 | Ahmed | G02B 6/4471 |
| 9,780,483 B1 * | 10/2017 | Goulbourne | H01R 13/5812 |
| 9,989,711 B2 * | 6/2018 | Ott | G02B 6/3887 |
| 2003/0024332 A1 * | 2/2003 | Traphagen | G01D 11/245 |
| | | | 73/866.5 |
| 2006/0144611 A1 * | 7/2006 | Chiu | H01R 9/03 |
| | | | 174/74 R |
| 2008/0025670 A1 * | 1/2008 | Castagna | G02B 6/4478 |
| | | | 385/69 |
| 2010/0022124 A1 | 1/2010 | Shie | |
| 2012/0274064 A1 | 11/2012 | Moore | |
| 2014/0341511 A1 * | 11/2014 | Daems | G02B 6/3809 |
| | | | 385/77 |
| 2018/0269615 A1 * | 9/2018 | Simmonds | H01R 13/426 |

\* cited by examiner

STRAIN RELIEF HOSE BARB CABLE CONNECTOR

RELATED APPLICATION

This application claims the benefit of U.S. Provisional Application No. 62/650,835, filed Mar. 30, 2018 which is incorporated herein by reference.

BACKGROUND

Overstraining a flexible line, such as an electrical cable, a hose, a pipe, a data line, etc., due to frequent movement, flexing, or rotation of the flexible line can cause portions of the flexible line to deform, break or otherwise fail, particularly at the area or point or interface at which the flexible line is coupled to a rigid connector or other rigid device, such as an electronics device or other assembly. In some examples, a flexible limiter or similar component can be coupled to or otherwise support the flexible line near such problem area or point in an attempt to reduce strain on the flexible line when being pulled, bent, or otherwise strained relative to the attached assembly. Oftentimes, such flexible limiters are inadequate to reduce such strain on the flexible line, and can therefore fail at preventing damage to the flexible line, which can result in the flexible line working improperly. This can have an undesirable effect on the operation of the assembly that the flexible line is coupled to, such as failure to effectively transfer electrical power an electronics assembly (in an example where the flexible line is a power cord).

SUMMARY

In one example, the present disclosure sets forth an electrical cable connector assembly for relieving strain on an electrical cable coupleable to an electronics device comprising an electronics connector fitting, a connector body and an elongate compliant sleeve. The electronics connector fitting can have a first coupling portion and a second coupling portion (the first coupling portion coupleable to an electronics device). The connector body can have a connection portion coupleable to the second coupling portion of the electronics connector fitting. Further, the connector body has a sleeve interface portion formed about an outer surface of the connector body. The elongate compliant sleeve has a connector interface portion coupleable to the sleeve interface portion of the connector body to form a coupling interface having a keyed profile. The elongate compliant sleeve also has an electrical cable channel configured to receive a portion of an electrical cable which is electrically coupleable to the electronics device. The elongate compliant sleeve is also configured to relieve strain on the electrical cable, in response to movement of the electrical cable relative to the electronics connector fitting, in at least one radial direction relative to a longitudinal central axis of the connector body.

In one example, the electrical cable connector assembly comprises a cord grip device coupled to the connector body. The cord grip device can comprise a tubular mesh grip configured to extend into the electrical cable channel of the elongate compliant sleeve, and the tubular mesh grip is operable to limit movement of the electrical cable relative to the connector body.

In one example, the cord grip device comprises a rigid ring attached to the tubular mesh grip, the tubular mesh grip comprising a bias shape configured to be compressibly engaged with the electrical cable to restrict movement of the electrical cable relative to the connector body, wherein the rigid ring is sized and configured to be retained by the electronics connector fitting and the connector body. The tubular mesh grip may also extend through a portion of the connector body and at least partially into the electrical cable channel of the elongate compliant sleeve.

In one example, the electrical cable channel comprises a cross sectional area sized larger than a cross sectional area of the electrical cable to permit movement of the electrical cable relative to the elongate compliant sleeve to relieve strain on the electrical cable.

In one example, a gap is defined between the electrical cable channel and a portion of the electrical cable, and in one example the gap is at least 0.02 mm.

In one example, the cross sectional area of the electrical cable channel is proximate an end opening portion of the elongate compliant sleeve, such that a portion of the electrical cable can be unrestrained from the elongate compliant sleeve proximate the end opening portion of the elongate compliant sleeve.

In one example, the keyed profile includes complementary protrusions and recesses.

In another example, the complementary protrusions and recesses comprises a plurality of flanges spaced apart and formed annularly around the connector body. Further, a plurality of grooves can be formed about inner surface of the elongate compliant sleeve at locations that correspond to the plurality of flanges such that the respective pluralities of flanges and grooves are configured to be mated together.

In one example, each flange comprises a groove engagement surface that extends generally orthogonal relative to the longitudinal central axis of the connector body, and comprises a one-way insert surface that extends transverse relative to the groove engagement surface, such that the connector body is insertable in one direction into a connector receiving opening of the elongate compliant sleeve but is restrictable from being removed from the connector receiving opening in the opposite direction due to the groove engagement surfaces operable to restrict such removal.

In one example, the complementary protrusions and recesses comprises a rotary locking interface mechanism operable to lock the elongate compliant sleeve to the connector body upon rotation of the elongate compliant sleeve relative to the connector body.

In one example, a bendable elongate portion of the elongate compliant sleeve configured to extend outward from the connector body at a sleeve length that is at least two times a total length of the connector body.

In one example, the connector body is comprised of a rigid material comprising one of a non-metallic material or a metallic material, and wherein the elongate compliant sleeve is comprised of an elastic material.

In one example, an insulating portion of the elongate compliant sleeve is sized and shaped to cover outer surfaces of the connector body and the electronics connector fitting to prevent exposure of the connector body and the electronics connector fitting to the ambient environment.

In one example, the elongate compliant sleeve comprises a bendable elongate portion that is sized and shaped to extend outwardly from the connector body, wherein the bendable portion is operable to bend or flex in 360 degrees radially around the longitudinal central axis of the connector body.

In one example, the elongate compliant sleeve and the electrical connector fitting have a common central axis that is collinear with the longitudinal central axis of the connector body when coupled together.

In one example, the elongate compliant sleeve comprises a plurality of modular segments that are removably coupleable to each other in series to vary a length of the elongate compliant sleeve.

In one example, the present disclosure sets forth an electrical cable connector assembly for relieving strain on an electrical cable coupleable to an electronics device comprising: an electronics connector fitting having a first coupling portion and a second coupling portion (the first coupling portion being coupleable to an electronics device); a connector body having a connection portion coupleable to the second coupling portion of the electronics connector fitting, and the connector body has a sleeve interface portion formed about an outer surface of the connector body; and an elongate compliant sleeve having a connector interface portion coupleable to the sleeve interface portion of the connector body. The elongate compliant sleeve has an electrical cable channel that loosely receives a portion of an electrical cable electrically coupleable to the electronics device, such that the electrical cable is limited from radial movement by deflection of the elongate compliant sleeve to relieve strain on the electrical cable in response to a pulling force on the electrical cable.

In one example, the electrical cable channel comprises a cross sectional area sized larger than a cross sectional area of the electrical cable to permit some movement of the electrical cable relative to the elongate compliant sleeve.

In one example, an elongate cross sectional area of the electrical cable channel along its entire length is sized larger than a cross sectional area of the electrical cable, such that a gap is defined between the electrical cable and an inner surface of the electrical cable channel to facilitate some movement of the electrical cable relative to the elongate cross sectional area. In one specific example, the gap is at least 0.02 mm and often from about 0 to about 1 mm. In one aspect, the inner surface can be in physical contact with the cable, so as to keep foreign particulates from entering into the sleeve. The physical contact can also allow for sliding movement upon bending. As a general guideline, the stiffness of the cable, in part, helps to determine an acceptable gap. If a very stiff cable is used, it will easily move inside the sleeve; whereas, a very thin and flexible cable can experience damage if the sleeve has an excessively tight grip on the cable which prevents sliding movement during bending.

As such, another method is to make the sleeve with an appropriate material, i.e. polyurethane, having a flexibility that allows stretching, bending, and compression consistent with the claims, even though the neck of the sleeve grips the cable with sufficient force to prevent ingress of particulates, i.e. water, dust, etc.

In one example, the connector interface portion and the sleeve interface portion form a coupling interface having a keyed profile with complementary protrusions and recesses. The complementary protrusions and recesses comprise a plurality of flanges spaced apart and formed annularly around the connector body. A plurality of grooves are formed about inner surface of the elongate compliant sleeve at locations that correspond to the plurality of flanges such that the respective pluralities of flanges and grooves are mated together. In this manner, the connector body is insertable in one direction into a connector receiving opening of the elongate compliant sleeve but is restricted from being removed from the connector receiving opening in the opposite direction.

In one example, the present disclosure sets forth an electronics device comprising an electrical cable connector assembly of one example described herein, wherein the electronics connector fitting is removably coupled to the electronics device, and wherein the connector body is removably coupled to the electronics connector fitting. Further, the electrical cable can be electrically coupled to the electronics device and is not directly attached to the elongate compliant sleeve. The elongate compliant sleeve can cover the connector body and the electronics connector fitting such that the electrical cable connector assembly is devoid of electrically conductive portions being exposed to the ambient environment when coupled to the electronic device.

The present disclosure also sets forth a method of coupling a connector electrical cable connector assembly (of one example described herein) to an electronics device. The method comprises sliding the elongate compliant sleeve over an electrical cable, and inserting the sleeve interface portion of the connector body, in a first axial direction, into a connector receiving opening of the elongate compliant sleeve, such that the elongate compliant sleeve is restricted from removal from the connector body in an opposite axial direction from the first axial direction.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

Figure 1:
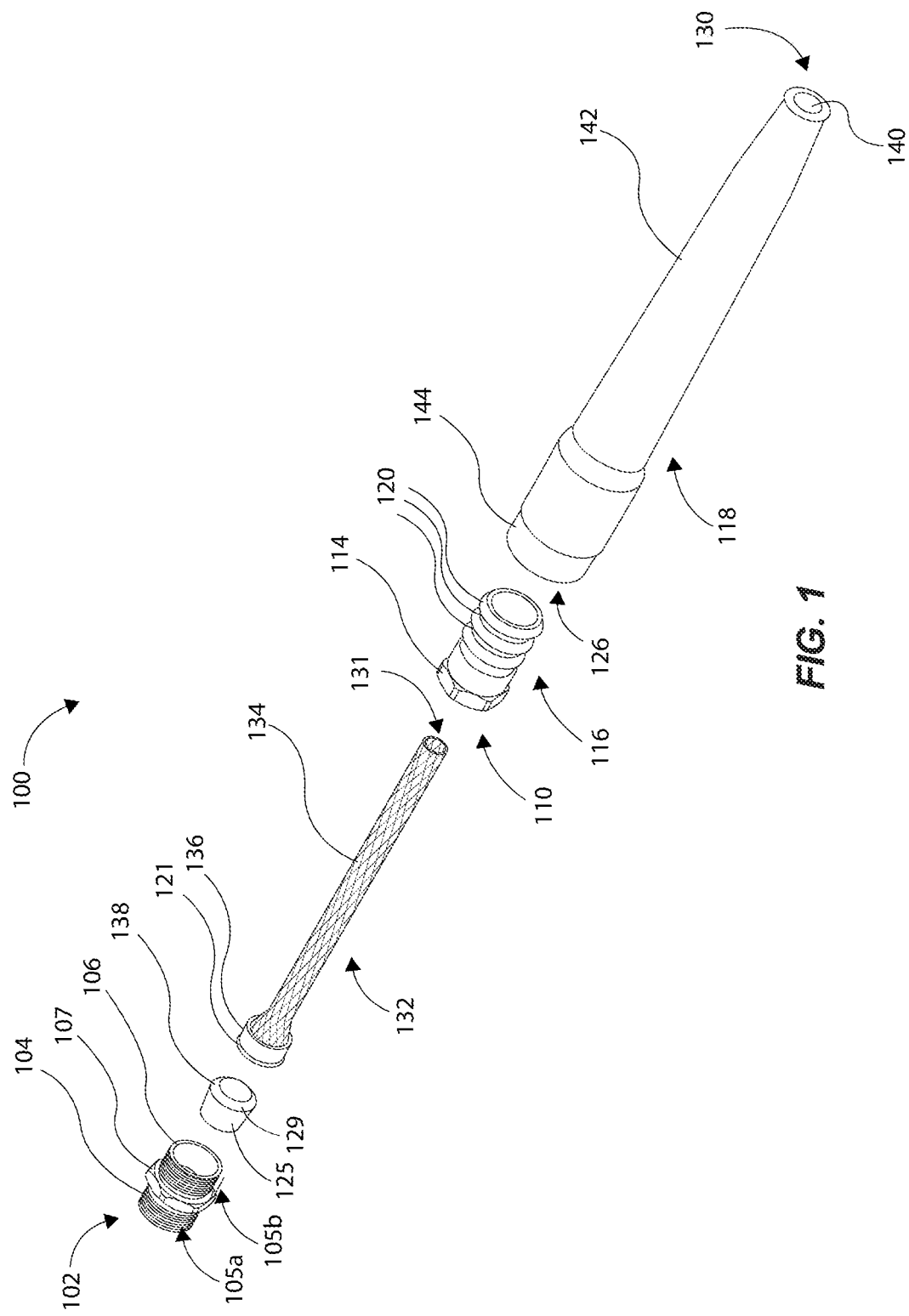
FIG. 1 illustrates an exploded view of an electrical cable connector assembly in accordance with an example of the present disclosure.

These drawings are provided to illustrate various aspects of the invention and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

Definitions

In describing and claiming the present invention, the following terminology will be used.

The singular forms "a," "an," and "the" include plural referents unless the context clearly dictates otherwise. Thus, for example, reference to "a recess" includes reference to one or more of such features and reference to "inserting" refers to one or more such steps.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, the term "about" is used to provide flexibility and imprecision associated with a given term, metric or value. The degree of flexibility for a particular variable can be readily determined by one skilled in the art. However, unless otherwise enunciated, the term "about" generally connotes flexibility of less than 5%, and most often less than 1%, and in some cases less than 0.01%.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, the term "at least one of" is intended to be synonymous with "one or more of." For example, "at least one of A, B and C" explicitly includes only A, only B, only C, or combinations of each.

Numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

With reference to FIGS. 1-5, various aspects of an electrical cable connector assembly 100 are illustrated in accordance with an example of the present disclosure. The electrical cable connector assembly can include an electronics connector fitting 102 having a first coupling portion 104 and a second coupling portion 106 (see e.g., FIG. 2B). The electronics connector fitting 102 can be a tubular shaped body having a central passageway or opening 103, and a hexagon nut portion 107 formed about an outer central area of the electronics connector fitting 102. The first coupling portion 104 can have outer threads 105a for threadably coupling the electronics connector fitting 102 to a threaded mating connector 109 of an electronics assembly or device 111 (FIG. 5), such as an industrial light, a generator, etc. In another example, the electronics connector fitting 102 can be coupled to an intermediate device or housing, which can then be coupled to an electronics device. Thus, a user can engage a tool to the hexagon nut portion 107 to rotate the electronics connector fitting 102 when interfaced to the threaded mating connector 109 of the electronics device 111, thereby threadably coupling the electronics connector fitting 102 to corresponding threads thereof. Alternatively, a hand-crank portion could be formed about the electronics connector fitting 102 for turning it by hand to engage or disengage the electronics connector fitting 102 from the electronics device.

In one example, the electrical cable connector assembly 100 can facilitate and support extending an electrical power cable 108 (FIGS. 2A, 2B, and 5) through the central opening 103 of the electronics connector fitting 102, and then threadably coupling the electronics connector fitting 102 to the threaded mating connector 109 of the electronics device 111 for purposes of power supply, for instance. Note that, for purposes of illustration clarity, the electrical power cable 108 is not cross sectioned in FIGS. 2A and 2B. In other examples, the electrical cable connector assembly 100 can support and facilitated coupling another type of line, such as a data transmission line, gas line, or other flexible lines that could benefit from strain relief provided by the electrical cable connector assembly 100, as detailed below. In one aspect, the electrical power cable can be a SOOW, SJOOW, SEOOW, SJEOOW, W, SEOW, STW, STOW, SV, SVO, or the like. In another aspect, the electrical power cable can have an outer diameter of about 0.5 cm to 2.5 cm, and most often 0.8 cm to 1.7 cm.

Figure 2A:
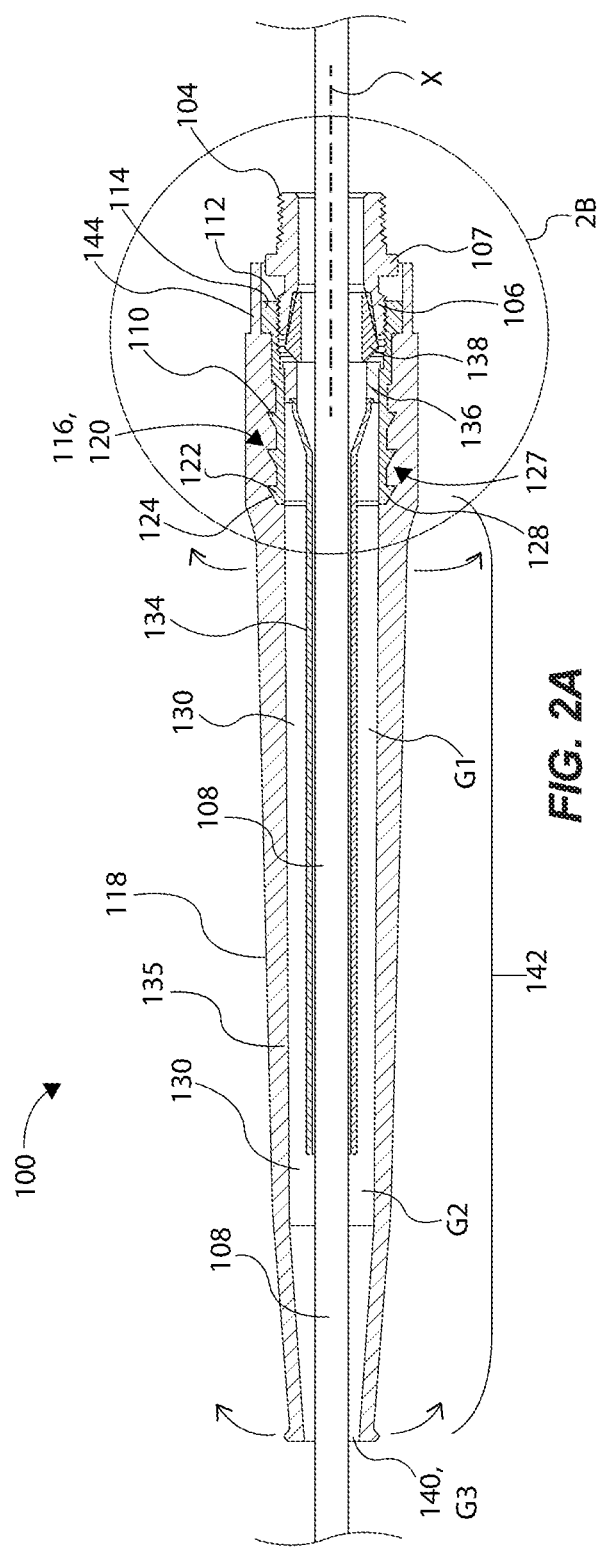
FIG. 2A is a cross sectional view of the electrical cable connector assembly of FIG. 1 taken along a longitudinal axis as assembled.
Figure 2B:
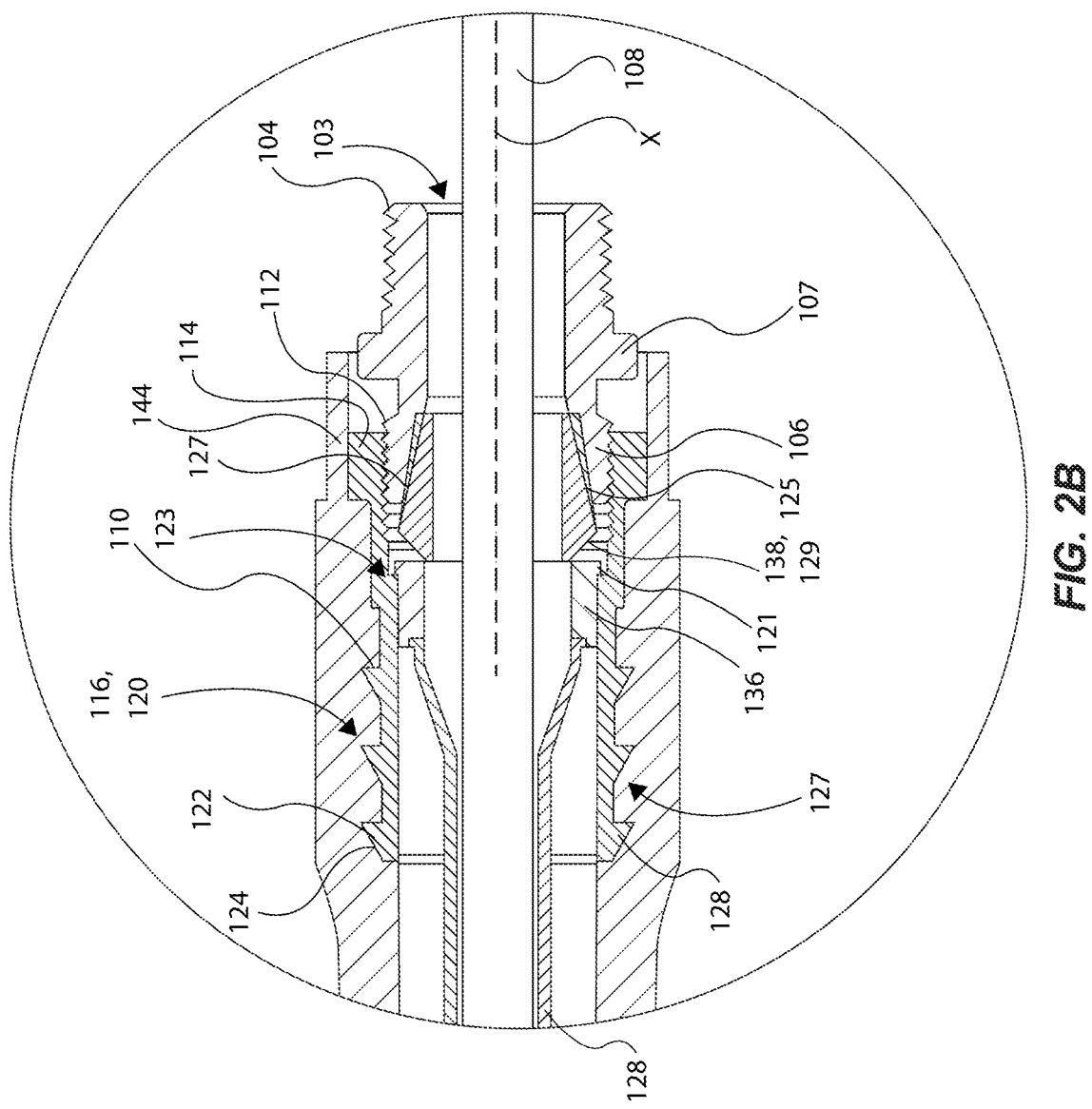
FIG. 2B is an enlarged view of a portion of FIG. 2A, and taken about circle 2B of FIG. 2A.
Figure 3:
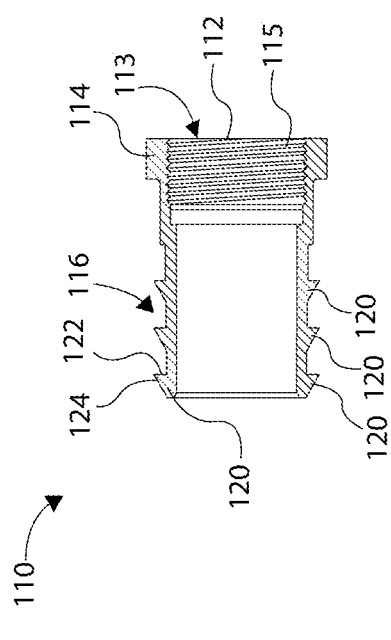
FIG. 3 is a cross sectional view of the connector body of the electrical cable connector assembly of FIG. 2A.
Figure 4:
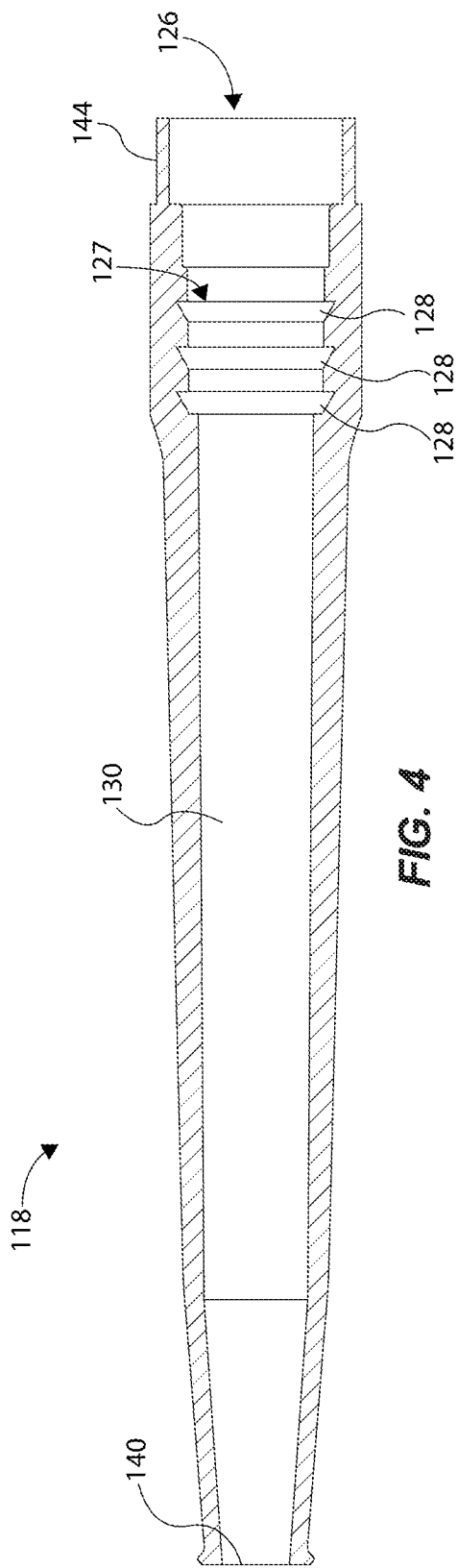
FIG. 4 is a cross sectional view of the elongate compliant sleeve of the electrical cable connector assembly of FIG. 2A.

The electrical cable connector assembly 100 can further comprise a connector body 110 having a connection portion 112 (FIG. 3) coupled to the second coupling portion 106 of electronics connector fitting 102 (FIG. 2B). The connector body 110 can be a tubular shaped body having a central passageway or opening 113 and a hexagon nut portion 114 formed about an outer area of a proximal end of the connector body 110. The connection portion 112 can have inner threads 115 for threadably coupling the connector body 110 to outer threads of the second coupling portion 106 of the electronics connector fitting 102, as shown in FIG. 2B. Thus, a user can engage a tool to the hexagon nut portion 114 to rotate the connector body 110, thereby threadably coupling (or uncoupling) the connector body 110 to the threads of the second coupling portion 106. Of course, the electrical power cable 108 can be extended through the central opening 113 of the connector body 110, and then the connector body 110 can be slid along the electrical power cable 108 and then threadably coupled to the electronics connector fitting 102. The method of coupling the components of the assembly 100 together is further detailed below.

In one example, the connector body 110 can have a sleeve interface portion 116 formed about an outer surface of the connector body 110, and formed about a middle to distal end of the connector body 110. The sleeve interface portion 116 can take many forms and shapes, as detailed below, for coupling to (or interfacing with) an elongate compliant hose or sleeve 118, as detailed below. In the example shown in FIGS. 1, 2B, and 3, the sleeve interface portion 116 can comprise a plurality of protrusions or flanges 120 (3×) spaced apart and formed annularly around an outer area or surface of the connector body 110. Three of such flanges 120 are shown, but one or more than three could be used. With reference to the outermost or distal flange 120 of FIGS. 2B and 3, each flange 120 can comprise a groove engagement surface 122 extending transverse, and generally orthogonal, relative to a longitudinal central axis X of the connector body 110. The flange 120 can further comprise a one-way insert surface 124 that extends transverse relative to the groove engagement surface 122, such that the connector body 110 is insertable in one direction into a connector receiving opening 126 (FIG. 4) of the elongate compliant sleeve 118, but is restricted from being removed from the connector receiving opening 126 in the opposite direction due to the groove engagement surfaces 122 that restrict such removal. Thus, the flanges 120 can be somewhat barbed shaped, meaning each flange can extend backwards or in one direction axially to restrict or prevent movement of the elongate compliant sleeve 118 in the opposite direction when coupled together. However, in some examples, with sufficient amount of pulling force (e.g., 20 pounds), the elongate compliant sleeve 118 can be pulled off or from the connector body 112, because of the compliant nature of the elongate compliant sleeve 118 being able to flex or deflect outwardly and away from the flanges 120.

The elongate compliant sleeve 118 can comprise a connector interface portion 127 (FIGS. 2B and 4) mated or interfaced to the sleeve interface portion 116 of the connector body 110, thereby forming or defining a coupling interface having a keyed profile with complementary protrusions (e.g., flanges 120) and recesses. Thus, the elongate compliant sleeve 118 can include a plurality of recesses 128 (3×), such as annular grooves, formed about an inner surface of the connector interface portion 127 of the elongate compliant sleeve 118. The grooves or recesses 128 can be formed at locations that correspond to the locations of the respective protrusions 120 of the connector body 110, such that the respective protrusions 120 and grooves 128 can be mated together to define such coupling interface having such keyed profile. The recesses 128 can have corresponding shapes as the protrusions 120, so that the flanges or protrusions 120 are tightly fit into respective recesses 128 when the elongate compliant sleeve 118 is mated or coupled to the connector body 110.

In one example the elongate compliant sleeve 118 can be formed of a compliant or elastic material (e.g., polyurethane, PDMS polymer, nylon, polyethylene, fluorocarbon polymers such as TEFLON, VITON, etc., PVC, and the like). Similarly, the connector body 110 can be formed of a metallic material (e.g., aluminum, steel, etc.), or even any other rigid material, such as certain composites (graphene, carbon nanotubes, etc), chemical resistant plastics (TEFLON, etc.), electrically resistant or conductive plastics, and the like. Choice of specific materials can be partially governed by the intended environment during use. In some cases the connector body can be formed having minor flexibility which still retains a secure interface connection. In one example, the protrusions 120 can be formed of a compliant material while a base portion of the connector body 110 can be a fully rigid material. Regardless, the connector body 110 can be inserted into the connector receiving opening 126 of the elongate compliant sleeve 118, so that the elongate compliant sleeve 118 slightly deflects outwardly when the protrusions are pushed into the opening, until the respective protrusions 120 and recesses 128 are fully mated together, as shown in FIGS. 2A and 2B.

The elongate compliant sleeve 118 comprises or defines an electrical cable channel 130 (FIGS. 2A and 4) that extends centrally through and along the elongate compliant sleeve 118 from one end to the other end of the elongate compliant sleeve 118. The electrical cable channel 130 can be configured to receive a portion or length of the electrical power cable 108. Note that the term "elongate" can mean that a length of the elongate compliant sleeve 118 is longer or greater than a diameter of the elongate compliant sleeve 118. Thus, the elongate compliant sleeve 118 can be relatively long (e.g., 12 inches or more, and with a diameter of 1 inch, for instance), or it can be relatively short (e.g., 1.1 inches, and with a diameter of 1 inch, for instance).

Figure 5:
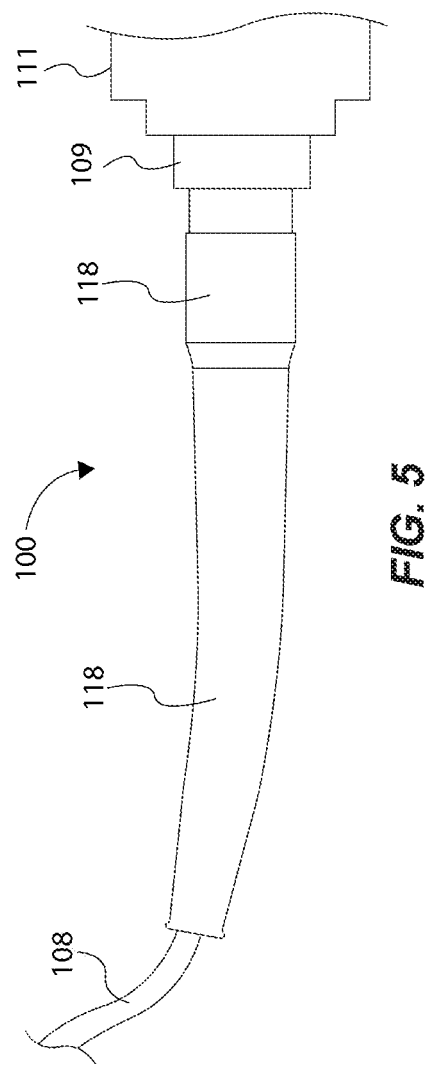
FIG. 5 is a side view of the electrical cable connector assembly of FIG. 1, and in a bent or flexed position, and attached to an electronics device, in accordance with an example of the present disclosure.

The elongate compliant sleeve 118 can be operable to relieve strain on one or more portions of the electrical cable 108, and in at least one radial direction relative to the longitudinal central axis X of the connector body 110. In other words, when the electrical power cable 108 is bent radially away from the longitudinal central axis X due to an external pulling force, as shown in FIG. 5, the elongate compliant sleeve 118 is caused to bend in the same direction with the electrical power cable 108. This reduces the bending moment exerted on the one or more portions of the electrical power cable 108, thereby reducing or minimizing a bending strain on the electrical power cable 108 to prevent it from breaking or bending beyond its strain threshold. That is, the elongate compliant sleeve 118 limits the amount of bending of the electrical power cable 108, so that the electrical cable can only be bent at a radius that is less than the critical curvature (breakage or deformation) of the electrical power cable 108 over a range of bending loads.

In one example, the electrical cable connector assembly 100 can comprise a cord grip device 132 coupled to the connector body 110 to further reduce strain on the electrical power cable 108. More specifically, the cord grip device 132 can comprise a tubular mesh grip 134 operable to restrict movement (axially and/or radially) of the electrical cable 108 relative to the connector body 110. The cord grip device 132 can comprise a rigid ring 136 fixedly attached to one end of the tubular mesh grip 134. The tubular mesh grip 134 can comprise a bias shape configured to be compressibly engaged with an outer surface or circumference of the electrical power cable 108 to restrict or limit movement of the electrical power cable 108 relative to the connector body 110 (and consequently, relative to the electronics device 111 that the cable 108 is attached to).

The tubular mesh grip 134 can extend through a portion of the central opening 113 of the connector body 110, and can extend at least partially through the electrical cable channel 130 of the elongate compliant sleeve 118, as shown in FIG. 2A. The tubular mesh grip 134 can be comprised of a plurality of interwoven strands, such as metallic cables or non-metallic strands, that operate to grip tightly around the electrical power cable 108, and that increasingly compressibly grip the electrical power cable 108 when it is pulled outwardly away from the rigid ring 136 ("outwardly" can mean the cable is being pulled axially or radially, or both). This also helps to reduce strain on the electrical power cable 108 when a pulling force is applied to the cable 108, so that it does not break or become damaged or disconnected from electrical contacts or connectors (not shown) of the electronics device 111.

As shown in FIGS. 2A and 2B, the rigid ring 136 can be sized and configured to be retained by, or between, the electronics connector fitting 102 and the connector body 110. That is, the rigid ring 136 can have an annular flange 121 that can be be seated against an inner annular surface or shoulder 123 of the connector body 110, and therefore the rigid ring 136 is situated inside the central opening 113 of the connector body 110. An elastomeric bushing 138 can be biased by the second coupling portion 106 of the electronics connector fitting 102 against one end of the rigid ring 136 to secure the rigid ring 136 into its seated position. The elastomeric bushing 138 can have a first outer sealing interface portion 125 that is tapered, and that interfaces to a tapered inner sealing surface 127 of the electronics connector fitting 102. The elastomeric bushing 138 can have a second outer sealing interface portion 129 that is tapered, and that can interface to the end of the rigid ring 136. In this manner, as the connector body 110 is threadably coupled to the electronics connector fitting 102, the elastomeric bushing 138 may slightly compress between the rigid ring 136 and the electronics connector fitting 102, which provides some compliance and sealing functionality. Thus, the electrical cable 108 can extend from the electronics device 111 (FIG. 5), through the central opening 103 of the electronics connector fitting 102, and through a central opening of the elastomeric bushing 138, and through a central opening of the rigid ring 136, and through a central passageway 131 of the tubular mesh grip 134, and then out through an end opening 140 of the elongate compliant sleeve 118. In this manner, the electronics connector fitting 102, the elastomeric bushing 138, the rigid ring 136, the tubular mesh grip 134, the end opening 140, and the elongate compliant sleeve 118 all have a common central axis that is collinear with the longitudinal central axis X of the connector body 110.

In one example of assembling together the components of the assembly 100, a user may slide the electronics connector fitting 102 over a free end of the electrical power cable 108 (while the other end of the electrical cable may be attached to the electronics device 111, or other component). The electronics connector fitting 102 can then be threadably coupled to the threaded mating connector 109 supported by the electronics device 111 (or other component). Then, the free end of the cable 108 can be received through the elastomeric bushing 138, and then the rigid ring 136, and then through the mesh grip 134. Then, the connector body 110 can be receive the free end of the cable 108, and then receive the mesh grip 134 until the rigid ring is seated in the connector body 110. Then, the connector body 110 can be threadably coupled to the electronics connector fitting 102, so that the bushing 138 and the ring 136 are sandwiched or pressed therebetween. Once the connector body 110 is rigidly coupled to the electronics connector fitting 102, the elongate compliant sleeve 118 can be slid over the free end of the cable 108 so that the cable 108 extends through the electrical cable channel 130, and then the user can press the elongate complainant sleeve 118 axially toward the connector body 110 with sufficient force (e.g., 2 pounds or more) until the flanges 120 and grooves 128 are appropriated mated together, as shown in FIGS. 2A and 2B. Note that the operations described above may be re-ordered (i.e., the complaint sleeve 118 may be mated to the connector body 110 before receiving the electrical power cable 108).

Notably, as best illustrated in FIGS. 2A and 2B, the tubular mesh grip 134 is loosely received through the electrical cable channel 130 such that a lateral space or gap G1 is defined between the tubular mesh grip 130 and an inner wall surface 135 of the elongate compliant sleeve 118 (the inner wall surface 135 defining the electrical cable channel 130). Similarly, the portion of the electrical power cable 108 that extends out of the distal end of the tubular mesh grip 130 is also loosely received through the electrical cable channel 130, such that a lateral space or gap G2 is defined between the electrical c power able 108 and the inner wall surface 135 of the elongate compliant sleeve 118. The electrical power cable 108 also loosely extends through the end opening 140 of the elongate compliant sleeve 118, such that a lateral space or gap G3 is defined between the end opening 140 and the electrical power cable 108. By "loosely" received, this can mean that the respective component (e.g., grip 130 or cable 108) extends through the electrical cable channel 130 unobstructed or unattached or unencumbered or unfettered relative to the elongate compliant sleeve 118, whether directly or indirectly. Thus, the only component that is directly coupled to or directly contacts the electrical power cable 108 is the tubular mesh grip 130, which allows a slight amount of axial and/or radial sliding of the electrical power cable 108, thereby further minimizing strain on the electrical power cable 108.

In some examples, any particular gap (i.e., G1, G2, or G3) may be at least 0.02 mm, as a lateral gap relative to the longitudinal axis X of the connector body 110. In other examples, any particular gap may be at least 5 mm. The size of the gaps may depend on the gauge of the electrical power cable 108, the length of the elongate compliant sleeve 118, the material of the elongate compliant sleeve 118, and other design aspect that may define the amount of slippage or sliding that may be appropriate for the particular electrical power cable relative to the elongate compliant sleeve 118, and for the environment or type of electronics device. For instance, a 5 pound electronics device may need a less stiff and shorter/smaller sleeve as compared to that required for a 100 pound electronics device, because often times users will pull or move the electronics device by pulling on the electrical power cable. Thus, an elongate compliant sleeve for a particular assembly may be sized to correspond to the weight of the electronics device that it is coupled to, particularly when the electronics device is a movable or mobile device that is not affixed to an immovable structure.

Thus, the electrical cable channel 130 comprises a cross sectional area (e.g., opening 140) sized larger than a cross sectional area of the electrical power cable 108 (proximate 140) to permit movement of the electrical cable relative to the elongate compliant sleeve 118 to relieve strain on the electrical power cable 108. Therefore, the electrical power cable 108 is not directly attached or coupled to any portion or surface or structure of the elongate compliant sleeve 118. As a result, the electrical power cable 108 can freely slide along or move relative to the elongate compliant sleeve 118 without hindrance and being unrestrained (except for the hindrance provided by virtue of the elongate compliant sleeve 118 restricting over constrained of the cable when bent). This is advantageous because the elongate compliant sleeve 118 will not pull or strain portions of the cable when bent, which would otherwise occur if the elongate compliant sleeve 118 were directly attached or secured to any portion of the electrical power cable 108, such as with existing heat-shrink sleeves that are affixed to the cable.

In one example, a bendable elongate section or portion 142 (FIG. 2A) of the elongate compliant sleeve 118 extends outward from the connector body 110 about a sleeve length that is at least two times a total length of the connector body 110. This ensures that the elongate compliant sleeve 118 has sufficient material disposed outwardly from an end of the connector body 110 to provide a sufficient amount of bending compliance to reduce strain on the electrical power cable 108 when moved radially. The portion of the bendable elongate portion 142 that is closest to the connector body 110 is more rigidly compliant than a distal end of the compliant sleeve proximate the end opening 140, as illustrated by the arrows, and as shown in FIG. 5. This is because of the compliant nature of the material of the elongate compliant sleeve 118, and also because a thickness of the wall of the elongate compliant sleeve 118 is thicker near the connector body 110, and then becomes decreasingly thinner toward the end opening 140, while also traversing inwardly toward the longitudinal axis X in a tapering manner.

The bendable portion 142 can be relatively unrestricted from radial movement, so that it can bend or flex in 360 degrees radially around and outwardly form the longitudinal central axis X of the connector body 110 to reduce or relieve strain on the electrical power cable 108. The bendable portion 142 can also formed of a particular material (e.g., polyurethane), and a particular shape and length, to resist fatigue over repeated amounts of bending (e.g., 100 k+number of repeated bends) without failure, such as breaking or cracking. This design can prolong the life of the connector assembly 100 and the electrical power cable 108, because a relatively large amount of pulling force may be exerted on the electrical power cable 108 in extreme cases, such as 50 pounds of force at a time, or even more in some incidents.

The bendable portion 142 may be sufficiently compliant, yet stiff enough to allow the electrical power cable 108 to bend up to 90 degrees relative to the longitudinal axis X without breaking or damaging the electrical power cable 108. In other cases, the electrical power cable 108 may be bent up to 180 degrees relative to the longitudinal axis without breakage or damage because of the configuration of the elongate compliant sleeve 118, as exemplified herein. As a general guideline the permissible range of motion is limited to the minimum bend radius (e.g. 2014 NEC Section 300.34, ICEA S-75-381, and 2014 NEC Section 330.24). In some examples, the minimum bend radius is 12 times an overall cable diameter, in other cases 8 times, and in yet other cases 6 times the cable diameter.

In one example, an insulating portion 144 of the elongate compliant sleeve 118 can extend outwardly along the longitudinal central axis X, and can cover outer surfaces of the connector body 110 and the electronics connector fitting 102 to prevent exposure of the connector body 110 and the electronics connector fitting 102 to the ambient environment. This can help reduce or eliminate the risk of accidental human electrical shock from touching the connector body 110 and the electronics connector fitting 102, and/or can reduce the risk of electrically induced sparks that may originate from such outer metallic surfaces of the connector body 110 and the electronics connector fitting 102, which is necessary to prevent in certain environments, such as on aircraft, gaseous environments, etc.

Figure 6:
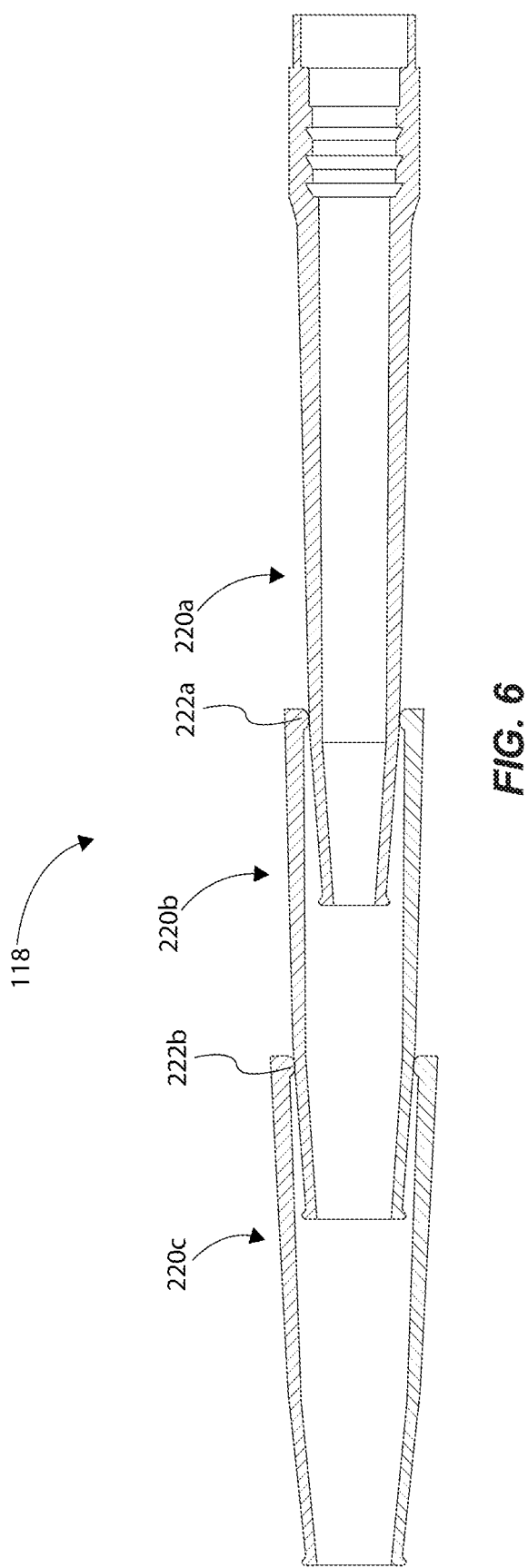
FIG. 6 is a cross sectional view of the elongate compliant sleeve of FIG. 4, and having one or more modular compliant sleeves attached to the elongate compliant sleeve, in accordance with an example of the present disclosure.

FIG. 6 illustrates a modular sleeve configuration, in accordance with an example of the present disclosure. More specifically, a particular elongate compliant sleeve 218 can comprise a plurality of modular segments 220*a-c* that are removably coupleable to each other in series to vary a length of the elongate compliant sleeve 218. Note that modular segment 220*a* can be the same or similar as the elongate compliant sleeve 118 of FIG. 1. The modular segment 220*b* and 220*b* can be comprised of the same or similar material as the elongate compliant sleeve 118 discussed above, and can have the same tapered shape, as shown, or can be more linearly shaped along their outer surfaces. The modular segment 220*b* can be interfaced or coupled to an outer surface of modular segment 220*a*, while segment 220*c* can be interfaced or coupled to an outer surface of modular segment 220*b*. Interface features, such as keyed profiles (e.g., recesses and protrusions of FIG. 2B) can be utilized between modular segments 220*a-c* to removably couple them together. In one example, annular rib portions 222*a* and 222*b* can be inwardly formed about an inner surface of the ends of the complaint sleeves 220*a* and 220*b*, which can be interfaced or locked to complementary recesses (not shown) on the outer surfaces of mated compliant sleeves to provide male/female interface, although any suitable interface features may be used. Any number of modular segments can be used to vary the length, and therefore the compliance characteristics, of a particular elongate compliant sleeve. Under this design, a multi-segmented or gradated sleeve can be formed which is firm at the coupling end, more flexible in the middle, and very flexible near the end. For example, the sleeve can be formed thicker at the nut, with gradated reduction in thickness to the thin tip. This can also be accomplished having a uniform sleeve thickness with different composition of materials at the nut, middle, and tip, each region having varied flexibility.

Figure 7:
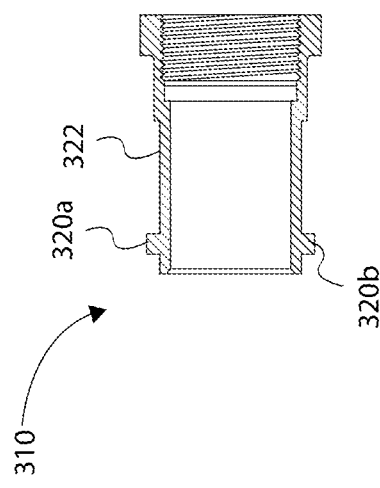
FIG. 7 is a cross sectional view of a connector body of an electrical cable connector assembly, in accordance with an example of the present disclosure.
Figure 8:
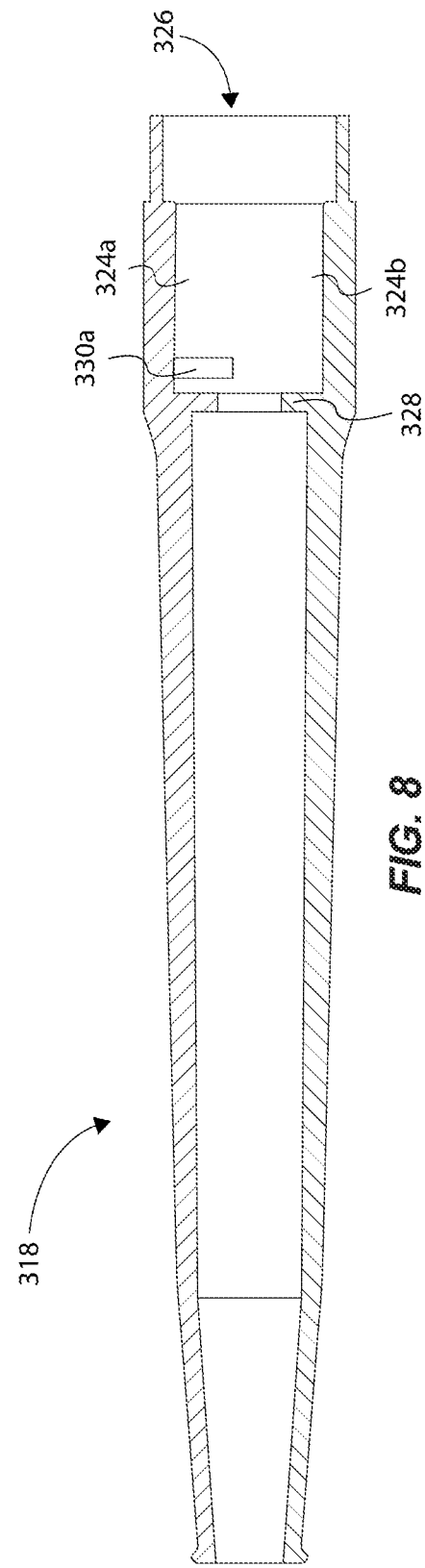
FIG. 8 is a cross sectional view of an elongate compliant sleeve of an electrical cable connector assembly, and that is operable with the connector body of FIG. 7, in accordance with an example of the present disclosure.

FIGS. 7 and 8 illustrate an alternative configuration that can replace the above-discussed connector body 110 and elongate compliant sleeve 118. Here, a connector body 310 and elongate compliant sleeve 318 can define a rotary locking interface system or mechanism. More specifically, the connector body 310 can comprise a pair of opposing protrusions 320*a* and 320*b* formed about an outer surface 322 of the connector body 310, and formed proximate a distal end of the connector body 310. The connector body 310 can replace the connector body 110, such that the connector body 310 can be similarly coupled to the electronics connector 104 described above (see e.g., FIG. 2B). Likewise, the rigid ring 138 of the grip device 132 can also be coupled to and inside of the connector body 110, similarly as shown in FIG. 2B. Accordingly, the elongate compliant sleeve 318 can be inserted or slid onto the connector body 310 in a manner so that the protrusions 320*a* and 320*b* slide or move along opposing slots 324*a* and 324*b* formed about a connector receiving opening 326 formed through an end of the elongate compliant sleeve 318. Once the connector body 310 is fully received into the connector receiving opening 326, such that the protrusions 320*a* and 320*b* are abutted against a wall section 328 of the elongate compliant sleeve 318, the elongate compliant sleeve 318 can be rotated to "lock" or secure it to the connector body 310. In this manner, the protrusions 320a and 320b are rotated through T-shaped slot sections 330a and 330b (only slot section 330a is shown and labeled, because 330b would not be visible in this cross-sectional view). Such configuration can define a rotary locking interface mechanism having one or more T-shaped slot or recess formed through an inner area of the elongate compliant sleeve 318. In an alternative example, the T-shaped slot or recess can instead be a J-shaped slot or recess that operates similarly as the T-shaped slots.

In another example, the coupling interface (having the keyed profile with complementary protrusions and recesses) between the connector body and the elongate compliant sleeve can include other shapes and mating surfaces than shown in the drawings. For instance, the connector body can have a single protrusion (not formed annularly) in the shape of a hemisphere, cylinder, square, polygon, etc., or other suitable shapes, while the recess in the compliant sleeve would have a similar complementary shape.

Alternatively, mounting features can be integrated into the sleeve, segments, connector fittings, connector body, or the like. Mounting features can be added to or molded into the sleeve or other components. Such mounting features can include hanger holes, loops, clamps, magnets, etc. Such features can reduce damage caused by users hanging corresponding equipment from the cable.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. An electrical cable connector assembly for relieving strain on an electrical cable coupleable to an electronics device, comprising:
   an electronics connector fitting having a first coupling portion and a second coupling portion, and a passageway extending from the first coupling portion to the second coupling portion, the first coupling portion coupleable to an electronics device, and the passageway operable to support the electrical cable extending through the passageway;
   a connector body having a connection portion coupleable to the second coupling portion of the electronics connector fitting, the connector body having a sleeve interface portion formed about an outer surface of the connector body, the sleeve interface portion comprising a plurality of axially spaced protrusions; and
   an elongate compliant sleeve formed of a substantially elastic material and having a connector interface portion comprising a plurality of axially spaced recesses, the connector interface portions coupleable to the sleeve interface portion of the connector body to form a coupling interface having a keyed profile wherein each protrusion of the plurality of axially spaced protrusions is mated to a complementary recess of the plurality of axially spaced recesses, the elongate compliant sleeve having an electrical cable channel configured to receive a portion of an electrical cable electrically coupleable to the electronics device, the elongate compliant sleeve operable to relieve strain on the electrical cable, in response to movement of the electrical cable relative to the electronics connector fitting, in at least one radial direction relative to a longitudinal central axis of the connector body.

2. The electrical cable connector assembly of claim 1, further comprising a cord grip device coupleable to the connector body, the cord grip device comprising a tubular mesh grip configured to extend into the electrical cable channel of the elongate compliant sleeve, wherein the tubular mesh grip is operable to limit movement of the electrical cable relative to the connector body.

3. The electrical cable connector assembly of claim 2, wherein the cord grip device comprises a rigid ring attached to the tubular mesh grip, the tubular mesh grip comprising a bias shape configured to be compressibly engaged with the electrical cable to restrict movement of the electrical cable relative to the connector body, wherein the rigid ring is sized and configured to be retained by the electronics connector fitting and the connector body.

4. The electrical cable connector assembly of claim 1, wherein the electrical cable channel comprises a cross sectional area sized larger than a cross sectional area of the electrical cable to permit movement of the electrical cable relative to the elongate compliant sleeve to relieve strain on the electrical cable.

5. The electrical cable connector assembly of claim 4, wherein a gap is defined between the electrical cable channel and a portion of the electrical cable, wherein the lateral gap is at least 0.02 mm.

6. The electrical cable connector assembly of claim 4, wherein the cross sectional area of the electrical cable channel is proximate an end opening portion of the elongate compliant sleeve, such that a portion of the electrical cable is unrestrained from the elongate compliant sleeve proximate the end opening portion of the elongate compliant sleeve.

7. The electrical cable connector assembly of claim 1, wherein the protrusions and complementary recesses comprises a plurality of flanges spaced apart and formed annularly around the connector body, and comprises a plurality of grooves formed about an inner surface of the elongate compliant sleeve at locations that correspond to the plurality of flanges, such that the respective pluralities of flanges and grooves are configured to be mated together.

8. The electrical cable connector assembly of claim 7, wherein each flange comprises a groove engagement surface that extends generally orthogonal relative to the longitudinal central axis of the connector body, and comprises a one-way insert surface that extends transverse relative to the groove engagement surface, such that the connector body is insertable in one direction into a connector receiving opening of the elongate compliant sleeve but is restrictable from being removed from the connector receiving opening in the opposite direction due to the groove engagement surfaces operable to restrict such removal.

9. The electrical cable connector assembly of claim 1, wherein the protrusions and complementary recesses comprises a rotary locking interface mechanism operable to lock the elongate compliant sleeve to the connector body upon rotation of the elongate compliant sleeve relative to the connector body.

10. The electrical cable connector assembly of claim 1, wherein a bendable elongate portion of the elongate compliant sleeve configured to extend outward from the connector body at a sleeve length that is at least two times a total length of the connector body.

11. The electrical cable connector assembly of claim 1, wherein the connector body is comprised of a rigid material comprising one of a non-metallic material or a metallic material.

12. The electrical cable connector assembly of claim 1, wherein an insulating portion of the elongate compliant sleeve is sized and shaped to cover outer surfaces of the connector body and the electronics connector fitting to prevent exposure of the connector body and the electronics connector fitting to the ambient environment.

13. The electrical cable connector assembly of claim 1, wherein the elongate compliant sleeve comprises a bendable elongate portion that is sized and shaped to extend outwardly from the connector body, wherein the bendable portion is operable to bend or flex in 360 degrees radially around the longitudinal central axis of the connector body.

14. The electrical cable connector assembly of claim 1, wherein the elongate compliant sleeve and the electrical connector fitting have a common central axis that is collinear with the longitudinal central axis of the connector body when coupled together.

15. The electrical cable connector assembly of claim 1, wherein the elongate compliant sleeve comprises a plurality of modular segments that are removably coupleable to each other in series to vary a length of the elongate compliant sleeve.

16. An electrical cable connector assembly for relieving strain on an electrical cable coupleable to an electronics device, comprising:
   an electronics connector fitting having a first coupling portion and a second coupling portion, and a passageway extending from the first coupling portion to the second coupling portion, the first coupling portion coupleable to an electronics device, and the passageway operable to support the electrical cable extending through the passageway;
   a connector body having a connection portion coupleable to the second coupling portion of the electronics connector fitting, the connector body having a sleeve interface portion formed about an outer surface of the connector body, the sleeve interface portion comprising a plurality of axially spaced protrusions; and
   an elongate compliant sleeve formed of a substantially elastic material and having a connector interface portion comprising a plurality of axially spaced recesses, the connector interface portion coupleable to the sleeve interface portion of the connector body to form a coupling interface having a keyed profile wherein each protrusion of the plurality of axially spaced protrusions is mated to a complementary recess of the plurality of axially spaced recesses, the elongate compliant sleeve having an electrical cable channel that loosely receives a portion of an electrical cable electrically coupleable to the electronics device, such that the electrical cable is limited from radial movement by deflection of the elongate compliant sleeve to relieve strain on the electrical cable in response to a pulling force on the electrical cable.

17. The electrical cable connector assembly of claim 16, wherein the electrical cable channel comprises a cross sectional area sized larger than a cross sectional area of the electrical cable to permit some movement of the electrical cable relative to the elongate compliant sleeve.

18. The electrical cable connector assembly of claim 16, wherein an elongate cross sectional area of the electrical cable channel along its entire length is sized larger than a cross sectional area of the electrical cable, such that a gap is defined between the electrical cable and an inner surface of the electrical cable channel to facilitate some movement of the electrical cable relative to the elongate cross sectional area.

19. The electrical cable connector assembly of claim 18, wherein the gap is at least 0.02 mm.

20. The electrical cable connector assembly of claim 16, wherein the protrusions and complementary recesses comprises a plurality of flanges spaced apart and formed annularly around the connector body, and comprises a plurality of grooves formed about an inner surface of the elongate compliant sleeve at locations that correspond to the plurality of flanges, such that the respective pluralities of flanges and grooves are mated together when assembled, such that the connector body is insertable in one direction into a connector receiving opening of the elongate compliant sleeve but is restricted from being removed from the connector receiving opening in the opposite direction.

21. An electronics device comprising the electrical cable connector assembly of claim 16, wherein the electronics connector fitting is removably coupled to the electronics device, and wherein the connector body is removably coupled to the electronics connector fitting, and wherein the electrical cable is electrically coupled to the electronics device and is not directly attached to the elongate compliant sleeve, and wherein the elongate compliant sleeve covers the connector body and the electronics connector fitting such that the electrical cable connector assembly is devoid of electrically conductive portions being exposed to the ambient environment when coupled to the electronic device.

22. A method of coupling the connector electrical cable connector assembly of claim 16 to an electronics device, the method comprising sliding the elongate compliant sleeve over an electrical cable, and inserting the sleeve interface portion of the connector body, in a first axial direction, into a connector receiving opening of the elongate compliant sleeve, such that the elongate compliant sleeve is restricted from removal from the connector body in an opposite axial direction from the first axial direction.

23. The electrical cable connector assembly of claim 1, wherein the compliant sleeve comprises a material selected from the group consisting of polyurethane, silicone, polydimethylsiloxane polyethylene (PDMS) polymer, polyethylene, fluorocarbon polymers, and polyvinyl chloride (PVC).

24. The electrical cable connector assembly of claim 1, wherein the plurality of axially spaced protrusions comprises three protrusions and the plurality of axially spaced recesses comprises three recesses.

25. The electrical cable connector assembly of claim 1, wherein the portion of an electrical cable electrically coupleable to the electronics device has an outer diameter of about 0.8 cm to 1.7 cm.

* * * * *